United States Patent [19]
Wodecki

[11] Patent Number: 5,601,169
[45] Date of Patent: Feb. 11, 1997

[54] FLUID PRESSURE OVERLOAD RELEASE CLUTCH

[75] Inventor: Leszek M. Wodecki, Rockford, Ill.

[73] Assignee: British Autogard Limited, Cirencester, United Kingdom

[21] Appl. No.: 198,887

[22] Filed: Feb. 18, 1994

[51] Int. Cl.$^6$ .............................. F16D 25/08; F16D 43/20
[52] U.S. Cl. .................... 192/56.33; 192/56.3; 192/54.3; 192/85 R
[58] Field of Search ............................ 192/85 R, 85 CA, 192/56.3, 56.31, 56.33, 54.3

[56] References Cited

U.S. PATENT DOCUMENTS

| | | | |
|---|---|---|---|
| 2,642,971 | 6/1953 | Hagenbook | 192/56 F |
| 3,205,986 | 9/1965 | Kramer | 192/56 F |
| 3,298,488 | 1/1967 | McDonald | 192/56 F |
| 3,807,539 | 4/1974 | Reed | 192/56 F X |
| 4,770,281 | 9/1988 | Hanks | 192/85 LA X |
| 4,836,349 | 6/1989 | Sakamoto et al. | 192/56 F |
| 4,934,500 | 6/1990 | Hanks et al. | 192/56 F |
| 4,960,190 | 10/1990 | Fortune et al. | 192/56 F |

FOREIGN PATENT DOCUMENTS

| | | | |
|---|---|---|---|
| 1652692 | 5/1991 | U.S.S.R. | 192/56 F |
| 1363391 | 8/1974 | United Kingdom . | |
| 1370011 | 10/1974 | United Kingdom . | |
| 1394920 | 5/1975 | United Kingdom . | |
| 2210421 | 6/1989 | United Kingdom . | |

*Primary Examiner*—Andrea L. Pitts
*Attorney, Agent, or Firm*—Marshall, O'Toole, Gerstein, Murray & Borun

[57] ABSTRACT

A clutch comprising a pair of relatively rotatable and axially movable drive members, each having torque transmitting abutments, a relievable resilient biasing means to bias the drive members axially towards each other so as to be disengagably connected in torque transmitting relationship by a plurality of torque transmitting elements which are interposed between the drive members and which are biased into torque transmitting relationship with the torque transmitting abutments by the biasing means when the clutch is engaged and relieving means to relieve the relievable resilient biasing means so that the torque transmitting elements are movable out of torque transmitting relationship with the torque transmitting abutments to disengage the clutch and a cage, which is free to rotate relative to both the drive members during disengagement, to guide the torque transmitting elements.

17 Claims, 1 Drawing Sheet

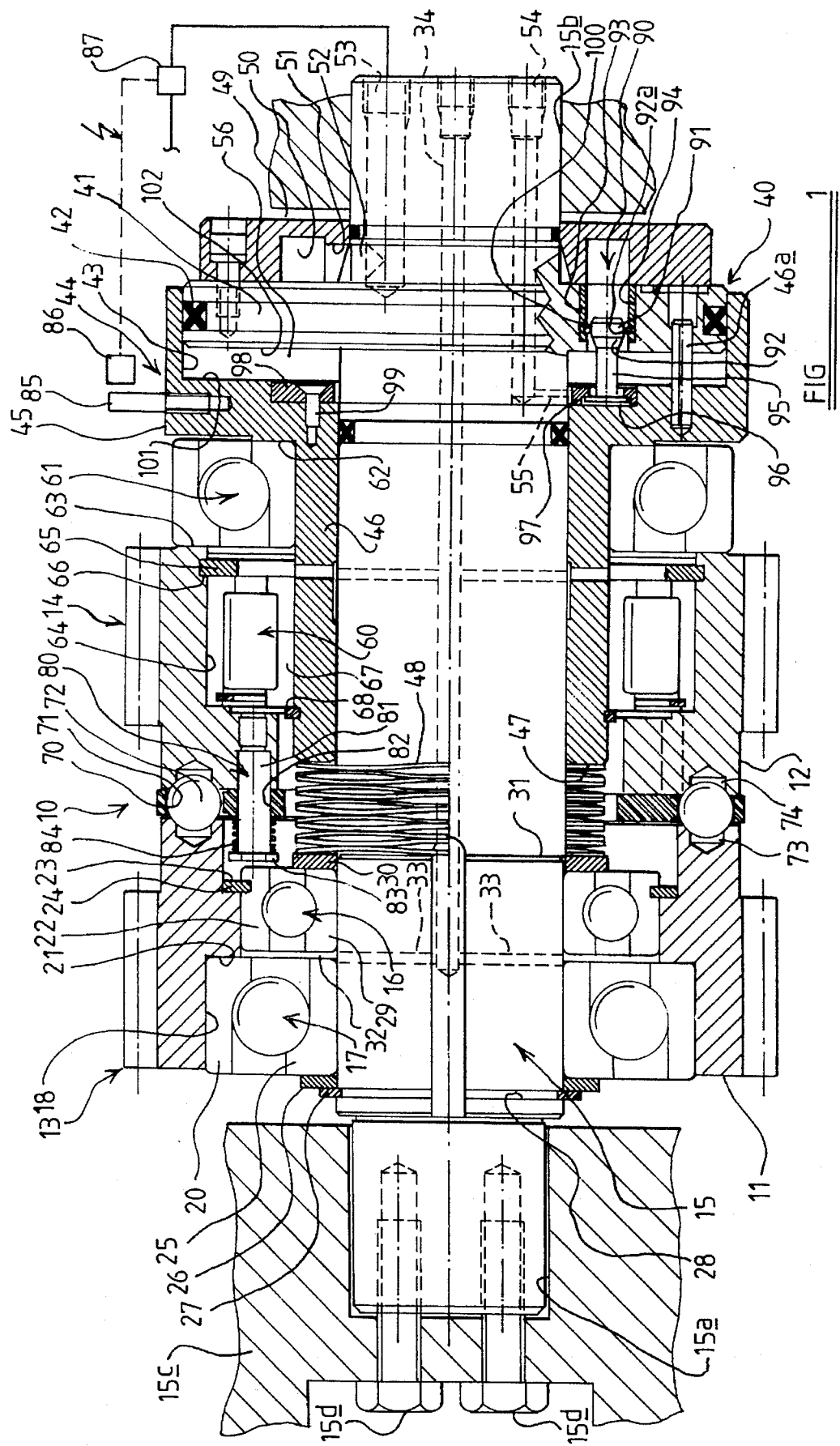

FLUID PRESSURE OVERLOAD RELEASE CLUTCH

BACKGROUND TO THE INVENTION

This invention relates to a clutch comprising a pair of relatively rotatable and axially movable drive members, each having torque transmitting abutments, a relievable biasing means to bias the drive members axially towards each other so as to be disengagably connected in torque transmitting relationship by a plurality of torque transmitting elements which are interposed between the drive members and which are biased into torque transmitting relationship with the torque transmitting abutments by the biasing means when the clutch is engaged and relieving means to relieve the relievable biasing means so that the torque transmitting elements are movable out of torque transmitting relationship with the torque transmitting abutments to disengage the clutch and a cage, which is free to rotate relative to both the drive members during disengagement, to guide the torque transmitting elements.

Such a clutch is referred to hereinafter as being "of the kind specified".

An object of the invention is to provide a new and improved clutch of the kind specified.

SUMMARY OF THE INVENTION

According to a first aspect of the present invention we provide a clutch of the kind specified wherein the biasing means comprises first and second relatively biased elements, the first element being axially located relative to a support and the second element being axially movable relative to the support and the second element having an elongate mounting part which is axially slidably mounted on the support to mount the second element for said axial movement relative thereto.

According to a second aspect of the invention we provide a clutch of the kind specified wherein one of said drive members is axially located and rotatable relative to a support and the other of said drive members is axially movable and rotatable relative to the support and wherein each of said drive members are provided with a torque transmitting connection to provide a torque path through the clutch which is not transmitted through the support.

The torque transmitting connection may be a set of gear teeth provided, preferably peripherally, on each drive member.

The biasing means may comprise first and second relatively biased elements, the first element being axially located relative to the support and the second element being axially movable relative to the support and each element being non-rotatably located relative to the support and wherein said other of said drive members is rotatably and non-axially movably mounted on said second element for axial movement therewith relative to the support.

The second element may have an elongate mounting part which is axially slidably mounted on the support to mount the second element for said axial movement relative to the support.

In either aspect of the invention:

The support may be static.

The biasing means may comprise a fluid pressure biasing means.

The relieving means may operate to release the fluid pressure.

The biasing means may comprise a resilient biasing means.

Movement of the drive members away from each other may cause operation of the relieving means.

The other drive member may be rotatably mounted on the second element, preferably on the elongate mounting part, for example, by means of a rolling element radial function bearing and a rolling element thrust function bearing may be provided between the second element and said other member to transmit said bias therebetween.

Said one drive member may be mounted on the support by means of a rolling element radial function bearing and a rolling element thrust function bearing, one race of the rolling element thrust function bearing being in engagement with an abutment on the support and the other race being in engagement with an axial abutment of the one drive member.

The first element may comprise a piston member formed integrally with or fixed to the support and received in a cylinder provided in one end of the second element and fluid under pressure being supplied to a chamber between the piston and one end of the cylinder so as to bias the first and second elements apart to provide said bias to the drive members.

Means may be provided to maintain the cage spaced further from a first of said drive members when the clutch is disengaged than when the clutch is engaged.

Drive member biasing means may be provided to move the drive members apart when the clutch is disengaged to provide a separation between the parts of the drive members which are engageable by the torque transmitting elements which is greater than the diameter of the torque transmitting elements.

The cage biasing means and the drive member biasing means each contribute to maintaining the torque transmitting elements out of engagement with the torque transmitting abutments of the first drive member.

Said means to maintain the cage spaced further from a first of said drive members comprise cage biasing means which bias the cage towards the second of said drive members. The second drive member may be said other drive member.

The drive member biasing means may bias the second element, and hence the other drive member mounted thereon, in a direction away from the first drive member.

The drive member biasing means may act between the second element and an abutment axially fixed relative to the support.

The drive member biasing means may comprise spring means to act between the second element and the abutment.

The spring means may comprise a plurality of spring (e.g. wave or belleville type) washers.

The cage biasing means may act between the other drive member and the cage.

In that case the cage biasing means may comprise at least one member fixed to the other drive member and extending to a position on the opposite side of the cage to the other drive member and there being spring means acting between the cage and a reaction means provided on said member on said opposite side of the cage.

The or each member may comprise a pin fixed at one end to the other member and having a head at its other end with a spring means disposed between the head and the cage.

The pin may be received in an arcuate slot provided in the cage so as to limit rotation of the cage relative to the other drive member.

The support may be provided with a passageway to feed fluid to the chamber between the piston and the cylinder.

The clutch may be a torque limiting clutch and the biasing means may be resilient biasing means, movement of the torque transmitting elements out of torque transmitting relationship occurs when the torque exceeds a predetermined value results in movement of the drive members axially apart by the torque transmitting elements and the relieving means to relieve the biasing means when the torque exceeds the predetermined value.

The other drive member may be provided with torque transmitting element receiving means within which the torque transmitting elements are received when the clutch is disengaged and the torque transmitting elements are maintained within the receiving means by the cage.

The cage may be provided with apertures within which the torque transmitting elements are received and is of a thickness to permit the torque transmitting elements to project from opposite sides of the cage to engage the torque transmitting abutments of the drive members.

The cage may be movable axially relative to each drive member and on disengagement of the clutch when the torque transmitting elements roll out of engagement with the abutments and move the drive members apart the cage is moved away from the other of the drive members.

The relieving means may comprise a position sensitive means, such as a micro-switch urged to actuate a valve to cause interruption in the supply of fluid pressure. The position sensitive means may also cause said fluid pressure to be relieved.

Alternatively, the relieving means may comprise a position sensitive means, such as a micro-switch arranged to actuate an electrically responsive valve, to cause interruption in the supply of fluid pressure to the biasing means.

The position sensitive means may also cause the fluid pressure to be relieved.

Alternatively, the relieving means may further comprise a valve means operable to relieve fluid pressure as a result of relative movement of the drive members on disengagement of the clutch.

Further alternatively the relieving means may be operable when it is desired to disengage the clutch independently of the torque being transmitted.

The biasing means may comprise at least one piston movable in a cylinder and the valve means comprises a valve member co-operating with a valve seat and the valve member being movable by the piston to move the valve member out of sealing engagement with the valve seat to relieve the fluid pressure.

BRIEF DESCRIPTION OF THE DRAWING

The invention will now be described by way of example with reference to the accompanying drawing wherein:

FIG. 1 is a longitudinal cross-sectional view through a torque limiting clutch embodying the invention.

DESCRIPTION OF THE PREFERRED EMBODIMENT

Referring to the FIGURE, there is illustrated a torque limiting clutch 10 comprising drive members 11, 12. In this example the member 11 will be described as a driving member and the member 12 as a driven member but it should be understood that if desired the member 12 may be the driving member and the member 11 the driven member.

The driving member 11 is provided with a helical gear 13 around its periphery whilst the driven member 12 is provided with a helical gear 14 around its periphery. The gear 14, in the present example, is intended to mesh with a suitable gear of a printing press whilst the gear 13 is intended to mesh with a gear driven by a drive motor.

In the illustrated example the gear teeth of the gear 13, 14 are formed integrally with the driving and driven members 11, 12 but, of course, if desired the driving and driven members may be of composite construction. Other torque transmitting connections may be provided to provide a torque path into and out of the drive members independent of the support on which they are held.

The members 11, 12 are carried by a static support shaft 15; the driving member 11 being rotatably mounted on the static support shaft 15 by a radial ballbearing 16 and a combined radial/thrust ballbearing 17 received in a stepped bore 18 of the driving member 11.

The support shaft 15 is supported in sockets 15a, 15b of a frame 15c of the printing press and is prevented from rotation relative to the frame 15c by bolts 15d.

The outer race 20 of the bearing 17 abuts a shoulder 21 of the stepped bore 18 whilst the outer race 22 of the bearing 16 is provided with a circumferentially extending groove in which a circlip 23 is received and which abuts a shoulder 24 of the stepped bore 18.

The inner race 25 of the bearing 17 is engaged by a washer 26 which abuts a circlip 27 received in a groove 28 of the support shaft 15. The inner race 29 of the bearing 16 abuts a thrust washer 30 and a gap 32 is provided between the races of the bearings 16, 17 which aligns with oil feeding galleries 33 extending from an axially extending oil feed bore 34 of the support 15.

The driving member 11 is thus mounted for rotation relative to the support 15 but is prevented from axial movement relative thereto.

The support 15 adjacent the opposite end to that which has the driving member 11 mounted thereon has an integral radially extending flange 40. However, if desired the flange 40 may be formed as a separate component and suitably attached to the remainder of the support 15.

The flange 40 provides a piston which has a circumferentially extending groove 41 in which a suitable seal 42 is retained. The piston 40 provides a first element of a resilient biasing means and is slidably received within a cylinder 43. The cylinder 43 is provided in an enlarged part 45 of a second element 44 of the resilient biasing means. Extending from the part 45 is a tubular elongate mounting part 46 approximately twice as long as the length of the part 45. The elongate mounting part 46 is slidably mounted on the support 15 and at its free end 47 is engaged with drive member biasing means comprising a plurality of spring washers 48 which are of wave type but may be of other type, e.g. belleville type, or may be any other suitable type of resilient biasing means, interposed between the free end 47 of the mounting part 46 and the hereinbefore mentioned thrust washer 30. Pins 46a, fixed to the enlarged part 45, are slidably received in bores in the flange 40 to prevent relative rotation therebetween.

Fixed to the flange 40 is a cap member 49 provided with a circular exhaust gallery 50 which communicates with a radially inwardly extending passage 51 which is aligned with a radial passage 52 in the support 15 which is connected to an axial exhaust passage 53 therein.

The support 15 is provided with an air inlet passage 54 which communicates via a radial passage 55 to the interior of a chamber 56 between the piston 40 and the cylinder 43.

The mounting part 46 has the driven member 12 rotatably non-axially movably mounted thereon by means of a radial or roller bearing 60 and a combined radial-thrust ballbearing 61. The bearing 61 is interposed between a shoulder 62 provided on the enlarged part 45 of the second element 44 and an end surface 63 of the driven member 14. The roller bearing 60 is received in a counter-bore 64 of the driven member 14 and the outer race thereof is retained therein by a circlip 65 received in a groove 66.

The inner race 67 of the bearing 60 is engaged with a further circlip 68 received in a groove in the mounting part 46. Accordingly, the driven member 12 is rotatably mounted on the mounting part 46 by the roller bearing 60 whilst the biasing force to be applied thereto, as hereinafter to be described, by the biasing elements 40, 44, is transmitted by the bearing 61.

Interposed between the driving and driven members 11, 12 is a cage plate 70 which has a plurality of apertures 71 therein for torque transmitting elements in the form of balls 72. The apertures 71 are of frusto-conical configuration having a smaller diameter end adjacent the driving clutch member 11.

The thickness of the cage plate 70 relative to the diameter of the balls 72 is such that the smaller diameter end of the frusto-conical apertures 71 engage the balls, when the clutch is engaged, on a chord approximately mid-way between the centre of the ball and its surface.

The driving and driven members 11, 12 are provided with torque transmitting abutments 73, 74 respectively in the form of generally cylindrical recesses but they may be of other configuration such as frusto-conical. The choice of whether the recesses are cylindrical or conical, and in the latter the included angle of the core depends upon the desired torque capacity of the clutch since the greater the included angle the smaller the torque needed to bias the plates apart If desired the abutments may be of other configuration such as prism shaped.

A cage biasing means, indicated generally at 80, comprises a plurality of pins 81 threadedly received in bores in the driven member 12 and extending through arcuate slots 82 in the cage plate 70. At the free end of the pins 81 is an integral head 83 and a coil compression spring 84 is disposed between the head 83 and the cage plate 70 so as to urge the cage plate towards the driven member 12.

The second element 44 has an actuating member 85 fixed thereto to engage a sensor of a micro-switch 86, or other operating means, to open an electrically operable valve 87 in the supply of air to the passage 53 to cut off the supply of air thereto.

The piston 40 is provided with a valve 90 which is operative, as hereinafter to be described, to release the air pressure from within the cylinder 56 when the piston 40 has been moved to the right in the FIGURE as a result of disengagement of the balls 72 from their associated drive transmitting abutments 73, 74 as hereinbefore described.

The valve 90 comprises a valve head 91 movable into and out of sealing engagement with a valve seat 92 provided on a sleeve member 93 received in a counterbore 94 in the piston 40. The head 91 is connected to a stem 95 which extends through a small diameter part of the counterbore 94 and which has a flange 96 which is retained in an annular recess 97 of the first element 44 by a ring 98 held by screws 99 to the element 44.

When the clutch is engaged the head 91 is in sealing engagement with an 'O'-Ring 92a of the seat 92.

The actuating member, micro-switch and valve 87, as well as the valve 90, comprise a relieving means of the biasing means.

In use, normally the clutch members 11 and 12 are resiliently biased towards each other by a fluid pressure resilient biasing means provided by air under pressure in the chamber 56 of the resilient biasing means 42, 44. When the driving member 11 is rotated, then so long as the torque to be transmitted to the driven clutch member 12 is lower than a predetermined torque, torque is transmitted between the clutch member by the balls 72 and torque transmitting abutments 73, 74. When the torque to be transmitted reaches a predetermined torque the balls 72 begin to roll out of the associated abutments 73, 74 as a result of the force applied by the resilient biasing means 42, 44 being less than the resultant force tending to bias the driven member 12 to the right in the FIGURE.

As the driven member 12 moves away from the driving member 11 the second element 44 of the biasing means is also moved to the right in the FIGURE, the force being transmitted by the bearing 61 and this causes an actuating member 85 to engage a sensor of an operating means 86 such as a micro-switch to open an electrically operated valve 87 in the supply of air to the passage 53 so that the air supply is cut off.

When the clutch disengages and the part 44 is moved to the right in the FIGURE, the frusto-conical part 100 of the valve 90 is moved out of sealing engagement with the seat 92 and thus air from the chamber 56 enters the gallery 50 and passes to exhaust via the radial passages 51, 52 and longitudinal gallery 53.

As a result the resilient bias of the driven member 12 to the left in the FIGURE is relieved.

In addition, as the balls 72 ride out of their associated abutments 73, 74 they rotate and cause the cage plate 70 to rotate at half the relative speed between the driving and driven clutch members relative to each clutch member until the pins 81 in the cage plate arcuate slots 82 engage an end of the slot and relative rotation is stopped. At the same time, the cage plate 70 is moved away from the member 12 by the balls 72 riding out of their abutments 74 and engagment with the frusto-conical apertures 71 of the cage plate causing compression of the springs 84.

When the pressure in the chamber 56 is relieved, as described hereinbefore, the wave spring 48 biases the mounting part 46 and hence the driven clutch member 12 to the right in the FIGURE until the face 101 of the second element 44 comes into contact with the face 102 of the flange 40.

The rotation of the cage plate in relation to the member 12 is limited by the pins 81 so that the balls 72 engaged in the cage plate apertures 71 are not allowed to ride past the edge of the abutments 74 in the member 12.

When the fluid pressure is relieved and the member 12 is moved away, there is no contact between the balls 72 and the member 11.

The springs 84 urge the cage plate 70 to the right and thus the cage plate 70 guides the balls 72 into the abutments and maintains the balls therein whilst the driving member 11 continues to rotate relative to the driven member 12. The cage plate 70 thus maintains the balls 72 out of position for engagement with the abutments 73 of the driving member 11 so that relative rotation between the driving and driven members can continue without any risk of the balls chattering as a result of engagement with the abutment 73.

Since the springs 48 act between the second element 44 and the washer 30, both of which are stationary, no bearing means needs to be provided between these components.

By providing the relatively long mounting means 46 any tendency for the second element 44 to tilt is prevented and therefore the actuating member 85 is accurately positioned relative to the micro-switch or other relieving means operating means 86. In addition, if for any reason it is desired to attach an operating member to the member 44 which could impose a force tending to cause misalignment this is resisted so that no restriction to sliding movement relative to the support 15 occurs.

Because the drive is transmitted directly into and out of the driving and driven members 11, 12 by the gears 13, 14 and the torque is transmitted solely by the engagement of the driving and driven members with balls 72, and not through the support 15, no splined connection is required between any of the components. If present, axially slidable splines would be a potential point of wear with a possible variation in the co-efficient of friction, which could lead to inconsistency of the torque at which the clutch disengages. Any such disadvantages are overcome by the clutch of the present invention.

The axial reaction force between the driving clutch member 11 and the second element 44 is reacted solely through the support member 15 which is an integral part of the clutch. Accordingly, no such reaction force is required to be accommodated by any part of an apparatus with which the clutch is used and therefore the ability of any external component accurately to accommodate such reaction force is avoided.

By providing the bearing configuration described hereinbefore, and in particular by mounting the bearings 60, 61 on the mounting part 46 which is static with the member 15, there is no risk of drive being transmitted through the clutch by virtue of the bearings 60, 61 wholly or partially seizing up. Therefore, if maintenance is being carried out on a machine driven by the gear 14, then there is no risk of an operative being injured due to the machine starting to operate as a result of the bearing 60, 61 seizing up, since the mounting part 46 and member 15 are static and there is complete separation between the driven clutch member 12 and the driving clutch member 11, as previously described. Furthermore, should the bearings 16 and 17 between the driving clutch member 11 and the static part 15 seize up, the resultant loads will be accommodated by the static member 15 which is adjacent to the frame of the apparatus with which the clutch is used, and will not be transmitted to the bearings 60, 61 and hence would not be transmitted to the gear 14 even if the bearings 60, 61 had also seized up. Of course, the same safety factor is provided if the drive path is reversed.

If desired, different bearing configurations for the drive members 11 and 12 may be provided instead of those illustrated so long as a radial function bearing and a thrust function bearing is provided, whether as a bearing or bearings having solely a radial function or a thrust function or a combination of functions.

By providing a helical gear for the driven member 12, a helical reaction load can be applied to the driven member 12 which is reversed in direction on overrun. For example, where the clutch is used, for example in a printing press, and in an emergency stop condition the press is stopped quickly by means such as regenerative braking of the rolls, during the resultant rapid deceleration the rolls are attempting to drive the motor connected to the driving member 11 and hence axial loads transmitted by the helical gear 14 will be reversed compared with the normal situation when the rolls are driven by the motor connected to the driving member 11. By choosing the hand of the helical gear 14 a resultant axial force may oppose the biasing force applied by the air in the chamber 56 during normal running where the member 12 is being driven by the member 11 but which will add to the force applied by the air 56 during emergency stop. Such emergency stop is usually the highest torque condition required and one during which disengagement should not occur since if there were, there would then be no braking.

Although in this specification the fluid of the fluid pressure resilient biasing means is air, if desired any other suitable compressible fluid may be used, or an incompressible fluid such as hydraulic oil, so long as the hydraulic oil is connected in communication with a resilient means such as an accumulator or other means in which the incompressible fluid is acted upon by a resilient means such as a mechanically sprung piston, or by virtue of contact directly, or indirectly through a movable member (such as a piston or diaphragm), with a compressible fluid such as air.

In a modification, the clutch may be a simple clutch which is engageable/disengageable, independently of the torque being transmitted, by operating the relieving means manually or by torque independent control means. In this case the fluid may be incompressible and need not be provided with any resilient bias.

The features disclosed in the foregoing description, or the following claims, or the accompanying drawings, expressed in their specific forms or in terms of a means for performing the disclosed function, or a method or process for attaining the disclosed result, or a class or group of substances or compositions, as appropriate, may, separately or in any combination of such features, be utilised for realising the invention in diverse forms thereof.

I claim:

1. In a clutch comprising a pair of relatively rotatable and axially movable drive members, each having torque transmitting abutments, a relievable biasing means to bias the drive members axially towards each other so as to be disengagably connected in torque transmitting relationship by a plurality of torque transmitting elements which are interposed between the drive members and which are biased into torque transmitting relationship with the torque transmitting abutments by the biasing means when the clutch is engaged and relieving means to relieve the relievable biasing means so that the torque transmitting elements are movable out of torque transmitting relationship with the torque transmitting abutments to disengage the clutch and a cage, which is free to rotate relative to both the drive members during disengagement, to guide the torque transmitting elements, the improvement including a static support means wherein one of said drive members is mounted on and externally of the static support means so as to be axially located and rotatable relative to the static support means and the other of said drive members is mounted on and externally of the static support means and each of said drive members is provided with a torque transmitting connection independently of said static support means so as to provide a torque path through the clutch which is not transmitted through the static support means.

2. A clutch according to claim 1 wherein the biasing means includes a movable element having an elongate mounting part which is axially slidably mounted on the static support means for axial movement relative thereto.

3. A clutch according to claim 1 wherein the torque transmitting connection is a set of gear teeth provided on each drive member.

4. A clutch according to claim 1 wherein the biasing means comprises first and second relatively biased elements, the first element being axially located relative to the static support means and the second element being axially movable relative to the static support means and each element being non-rotatably located relative to the static support means and wherein said other of said drive members is rotatably and non-axially movably mounted on said second element for axial movement therewith relative to the static support means.

5. A clutch according to claim 1 wherein the clutch has at least one of the following features:

a) said one drive member is mounted on the static support means;

b) said other drive member is rotatably mounted on the second element;

c) said other drive member is rotatably mounted on an elongate mounting part of the second element;

d) said one drive member is mounted on the static support means by means of a rolling element radial function bearing and a rolling element thrust function bearing, one race of the rolling element thrust function bearing being in engagement with an abutment on the static support means and the other race being in engagement with an axial abutment of the one drive member;

e) said other drive member is rotatably mounted on the second element by means of a rolling element radial function bearing and a rolling element thrust function bearing provided between the second element and said other drive member.

6. A clutch according to claim 4 wherein the first element comprises a piston member formed integrally with or fixed to the static support means and received in a cylinder provided in one end of the second element and fluid under pressure being supplied to a chamber between the piston and one end of the cylinder so as to bias the first and second elements apart to provide said bias to the drive members.

7. A clutch according to claim 1 wherein means are provided to maintain the cage spaced further from a first of said drive members when the clutch is disengaged than when the clutch is engaged.

8. A clutch according to claim 1 wherein drive member biasing means are provided to move the drive members apart when the clutch is disengaged to provide a separation between the parts of the drive members which are engageable by the torque transmitting elements said separation being greater than the diameter of the torque transmitting elements.

9. A clutch according to claim 4 wherein drive member biasing means are provided to move the drive members apart when the clutch is disengaged to provide a separation between the parts of the drive members which are engageable by the torque transmitting elements and the drive member biasing means act between the second element and an abutment axially fixed relative to the static support means.

10. A clutch according to claim 7 wherein the cage biasing means act between the other drive member and the cage.

11. A clutch according to claim 10 wherein the cage biasing means comprise at least one cage biasing element fixed to the other drive member and extending to a position on the opposite side of the cage to the other drive member and there being spring means acting between the cage and a reaction means provided on said member on said opposite side of the cage.

12. A clutch according to claim 11 wherein the or each cage biasing element comprises a pin fixed at one end to the other member and having a head at its other end with a spring means disposed between the head and the cage.

13. A clutch according to claim 12 wherein the pin is received in an arcuate slot provided in the cage so as to limit rotation of the cage relative to the other drive member.

14. A clutch according to claim 1 wherein the clutch is a torque limiting clutch, the biasing means are resilient biasing means and movement of the torque transmitting elements out of torque transmitting relationship occurs when the torque exceeds a predetermined value and results in movement of the drive members axially apart by the torque transmitting elements and the relieving means to relieve the biasing means when the torque exceeds the predetermined value.

15. A clutch according to claim 1 wherein the relieving means comprises a position sensitive means, to actuate a valve to cause interruption in the supply of fluid pressure.

16. A clutch according to claim 1 wherein the relieving means comprise a valve means operable to relieve fluid pressure as a result of relative movement of the drive members on disengagement of the clutch.

17. A clutch according to claim 16 wherein the biasing means comprises at least one piston movable in a cylinder and the valve means comprises a valve member co-operating with a valve seat and the valve member being movable by the piston to move the valve member out of sealing engagement with the valve seat to relieve the fluid pressure.

* * * * *